(12) United States Patent
Catovic et al.

(10) Patent No.: US 8,583,119 B2
(45) Date of Patent: Nov. 12, 2013

(54) METHOD AND APPARATUS FOR MANAGEMENT OF AUTOMATIC NEIGHBOR RELATION FUNCTION IN WIRELESS NETWORKS

(75) Inventors: Amer Catovic, San Diego, CA (US);
Christophe Chevallier, San Diego, CA (US); Francesco Pica, San Diego, CA (US); Jay F. Dills, San Diego, CA (US);
Manish Tripathi, San Diego, CA (US);
Mukesh K. Mittal, San Diego, CA (US);
Mustafa Saglam, San Diego, CA (US);
Sunil S. Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 12/426,714

(22) Filed: Apr. 20, 2009

(65) Prior Publication Data
US 2009/0264130 A1 Oct. 22, 2009

Related U.S. Application Data

(60) Provisional application No. 61/046,713, filed on Apr. 21, 2008, provisional application No. 61/057,931, filed on Jun. 2, 2008.

(51) Int. Cl.
*H04W 36/00* (2009.01)

(52) U.S. Cl.
USPC .......................................... 455/436; 455/560

(58) Field of Classification Search
USPC ........... 455/434, 419, 423, 561, 560; 370/331
See application file for complete search history.

(56) References Cited

U.S. PATENT DOCUMENTS

| 5,724,665 | A | 3/1998 | Abbasi et al. | |
|---|---|---|---|---|
| 6,073,021 | A | 6/2000 | Kumar et al. | |
| 6,505,043 | B1 | 1/2003 | Aihara | |
| 7,065,361 | B1 | 6/2006 | Fortuna | |
| 7,085,570 | B2 * | 8/2006 | Tigerstedt et al. | 455/439 |
| 7,130,627 | B2 * | 10/2006 | Lundh et al. | 455/434 |
| 7,848,292 | B2 * | 12/2010 | Bl et al. | 370/331 |
| 8,359,061 | B2 * | 1/2013 | Masuda et al. | 455/525 |

(Continued)

FOREIGN PATENT DOCUMENTS

| CN | 1233928 A | 11/1999 |
|---|---|---|
| CN | 1237870 A | 12/1999 |

(Continued)

OTHER PUBLICATIONS

International Search Report and Written Opinion—PCT/US2009/041297, International Search Authority—European Patent Office—Nov. 25, 2009.

(Continued)

*Primary Examiner* — Peguy Jean Pierre
(74) *Attorney, Agent, or Firm* — Michael J. DeHaemer, Jr.

(57) ABSTRACT

Systems and methodologies are described that facilitate management of automatic neighbor relation functions in wireless networks. The system can include components and/or devices that ascertain whether or not to add or remove a neighbor relation based on information associated with an operations and management system, wherein the operations and management system dispatches add or remove requests to a base station that establishes, updates, and/or maintains a neighbor relations table and/or set of neighbor relations that includes neighbor relations between cells.

44 Claims, 13 Drawing Sheets

(56) References Cited

U.S. PATENT DOCUMENTS

| | | |
|---|---|---|
| 2003/0190916 A1* | 10/2003 | Celedon et al. .............. 455/437 |
| 2003/0224772 A1* | 12/2003 | Patzer et al. ................. 455/419 |
| 2006/0142016 A1 | 6/2006 | Can et al. |
| 2006/0172738 A1 | 8/2006 | Kwon et al. |
| 2009/0005030 A1* | 1/2009 | Han et al. ..................... 455/423 |
| 2009/0069014 A1* | 3/2009 | Rune ............................ 455/436 |
| 2009/0161628 A1 | 6/2009 | Kubota et al. |
| 2009/0170510 A1* | 7/2009 | Kim ............................. 455/434 |
| 2012/0149429 A1* | 6/2012 | Martin et al. ................. 455/525 |
| 2012/0190374 A1* | 7/2012 | Jo et al. ........................ 455/450 |
| 2013/0023286 A1* | 1/2013 | Soma et al. ............... 455/456.1 |

FOREIGN PATENT DOCUMENTS

| | | |
|---|---|---|
| CN | 101132357 A | 2/2008 |
| EP | 0944274 A2 | 9/1999 |
| EP | 0963130 A1 | 12/1999 |
| EP | 1071305 A2 | 1/2001 |
| EP | 1903816 A1 | 3/2008 |
| EP | 1919246 A1 | 5/2008 |
| GB | 2331892 A | 6/1999 |
| JP | 2005522156 A | 7/2005 |
| RU | 2005112739 A | 2/2006 |
| WO | WO9732445 A1 | 9/1997 |
| WO | WO9836588 | 8/1998 |
| WO | WO9836588 A2 | 8/1998 |
| WO | WO0169949 A1 | 9/2001 |
| WO | WO2004032551 A1 | 4/2004 |
| WO | WO2005104573 | 11/2005 |
| WO | WO2007027034 A1 | 3/2007 |
| WO | 2007083541 A1 | 7/2007 |
| WO | WO2007148911 A1 | 12/2007 |
| WO | 2008005225 A2 | 1/2008 |
| WO | WO2008002092 A2 | 1/2008 |

OTHER PUBLICATIONS

3GPP TSG-RAN WG3 #59bis, R3-080988, 3RD Generation Partnership Project (3GPP), Qualcomm Europe, T-Mobile, Telecom Italia, Orange, Huawei, Nortel, Ericsson and Alcatel-Lucent, Agenda Item 10.1.1a, Mar. 31-Apr. 3, 2008, Shenzhen, China, 4 pp.

3GPP TSG-RAN WG3 Meeting #59, R3-080453, 3RD Generation Partnership Project (3GPP), Ericsson, Qualcomm, T-Mobile, Orange, Huawei, Teliasonera and Vodafone, "Introduction of Automatic Neighbour Relation Function," Change Request 36.300 Version 8.3.0, Feb. 11-15, 2008, Sorrento, Italy, 3 pp.

Taiwan Search Report—TW98113233—TIPO—Nov. 11, 2012.

* cited by examiner

| NEIGHBOR RELATION | LOCAL CELL ID | TARGET CELL ID | No Remove | No Hand Over | No X2 |
|---|---|---|---|---|---|
| 1 | LCI#1 | TCI#1 | | | |
| 2 | LCI#1 | TCI#2 | | | ✓ |
| 3 | LCI#1 | TCI#3 | ✓ | | |

FIG. 10

METHOD AND APPARATUS FOR MANAGEMENT OF AUTOMATIC NEIGHBOR RELATION FUNCTION IN WIRELESS NETWORKS

CLAIM OF PRIORITY UNDER 35 U.S.C. §119

This application claims the benefit of U.S. Provisional Patent application Ser. No. 61/046,713 entitled "METHOD AND APPARATUS FOR MANAGEMENT OF AUTOMATIC NEIGHBOR RELATION FUNCTION IN WIRELESS NETWORKS" which was filed Apr. 21, 2008. Further, this application also claims the benefit of U.S. Provisional Patent application Ser. No. 61/057,931, entitled "METHOD AND APPARATUS FOR MANAGEMENT OF AUTOMATIC NEIGHBOR RELATION FUNCTION IN WIRELESS NETWORKS" which was filed Jun. 2, 2008. The entireties of the aforementioned applications are herein incorporated by reference.

BACKGROUND

I. Field

The following description relates generally to wireless communications, and more particularly to extending the baseline automatic neighbor relation (ANR) function in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with an aspect set forth herein the claimed subject provides an apparatus operable in wireless communication system that is configured to determine whether to add or remove a neighbor relation based on information associated with an operations and management system, and thereafter to send an add or remove request from the operations and management system to a base station. In accordance with a further aspect of the claimed subject matter, a machine-readable medium having machine-executable instructions stored thereon is provided, wherein the machine-executable instructions ascertain whether or not to add or remove a neighbor relation based on information associated with an operations and management system, and thereafter dispatch the add or remove requests from the operations and management system to a base station.

In accordance with a further aspect, provides a method employed in wireless communications systems, wherein the method utilizes a neighbor addition threshold or a neighbor removal threshold to control an automatic neighbor relation function, and updates a logical relationship associated with the automatic neighbor relation function tasked with making decisions about cell additions or cell removals based at least in part on the neighbor addition threshold or the neighbor removal threshold, or updates a logical relationship associated with the automatic neighbor relation function tasked with making decisions about cell additions or cell removals from a neighbor relations table based at least in part on the neighbor addition threshold or the neighbor removal threshold.

In accordance with yet a further aspect, the claimed subject matter provides an apparatus that retains instructions related to counting or storing the number of times a neighbor cell is reported by an access terminal in a fixed time interval, detecting an event where the neighbor cell is reported at least a fixed number of times, and thereafter establishing a neighbor relation based on whether the neighbor cell has been reported at least a fixed number of times.

Additionally and in accordance with a further aspect, an apparatus that retains instructions related to counting or storing the number of times a neighbor cell is reported by an access terminal in a fixed time interval, detecting the event where the neighbor cell is reported at least a fixed number of times, and thereafter establishing a neighbor relation in a neighbor relation table based on the detected event.

Further, in accordance with another aspect, an apparatus operable in wireless communication system that includes means for counting or storing the number of times a neighbor cell is reported by an access terminal in a fixed time interval, means for detecting an event where the neighbor cell is reported at least a fixed number of times within the fixed time interval, means for establishing a neighbor relation based at least in part on the neighbor cell being reported at least the fixed number of times within the fixed time interval; and means for establishing a neighbor relation in a set of neighbor relations based at least in part on the neighbor cell being reported at least the fixed number of times within the fixed time interval.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

FIG. 10 is an illustration of an example neighbor relations table as established, maintained and employed by the claimed subject matter.

DETAILED DESCRIPTION

Figure 1:
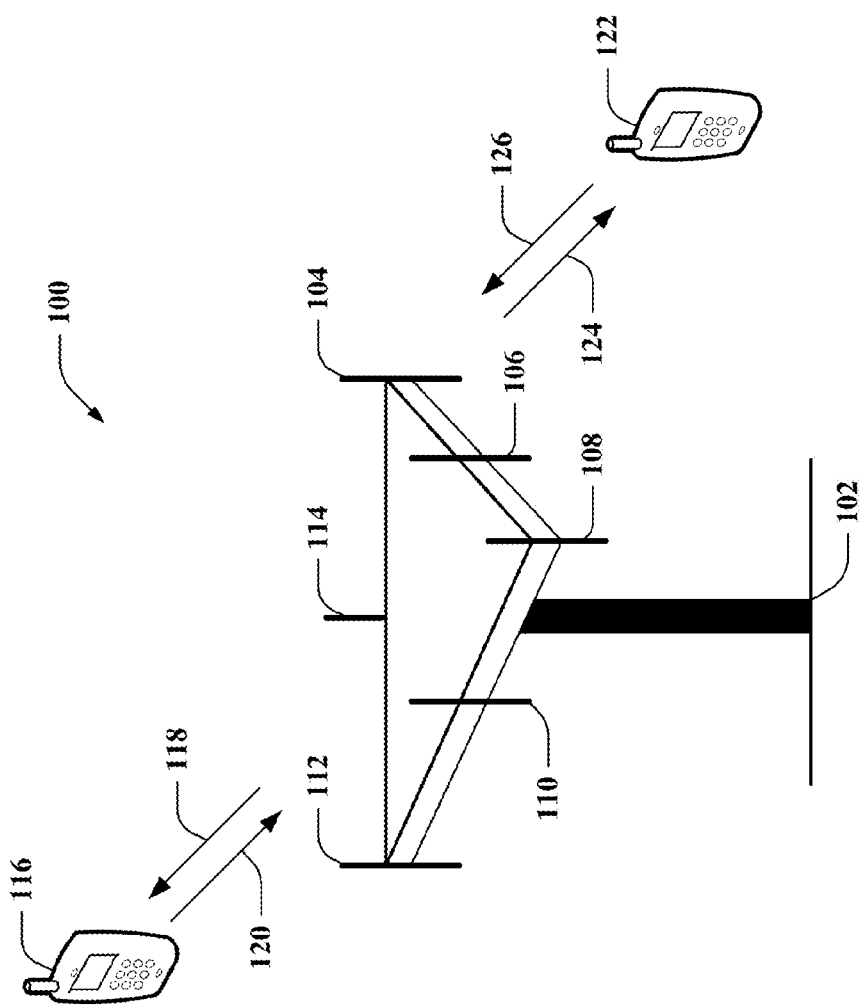
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The automatic neighbor relation (ANR) function provides automated management of neighbor relations between cells. In the baseline formulation of the ANR function the inputs to this function are typically the user equipment (UE) measurements of detected cells and additionally and/or alternatively other information internally produced by the base station, Evolved Node B (eNodeB), access point, or Node B (e.g., performance measurements, etc.) can also be utilized as input to the ANR function. Generally, the output of the ANR function is typically a set of neighbor relations. The ANR function can organize neighbor relations into a table (e.g., a Neighbor Relations Table). The baseline ANR function typically builds the neighbor relation table subject to constraints supplied by an operations and management (OAM) system which can also create new neighbor relations. Moreover, the baseline ANR function can send feedback to the OAM about the changes to existing neighbor relations or about newly created neighbor relations. This feedback may be in the form of a neighbor relation (NR) report. Nevertheless, the foregoing functionality can have two major areas that can be subject to improvement. First, the criteria for creating new and/or removing an existing neighbor relation by the ANR function is currently not specified (e.g., it can be vendor and/or implementation specific) which can be both a cause of inconsistent behavior for ANR functions implemented by different vendors, and operators that purchase base stations, Node Bs, Evolved Node Bs (eNodeBs), or access points from multiple vendors can have difficulties achieving consistent behavior of the ANR function in their networks. In particular, the number of user equipment reports of cell A received by the automatic neighbor relation function of cell B that will trigger the addition of the neighbor relation (B→A) is proprietary. For example, in a first vendor can implementation, the number of measurement reports containing cell A required to add a neighbor relation (B→A) to the neighbor relation table of cell B can be set to m (e.g., a first integer), whereas a second vendor implementation can set the number of measurement report containing cell A required to add a similar neighbor relation to the neighbor relation table of cell B to n (e.g., a second integer). Due to the proprietary nature of the addition and/or removal criteria, m may not equal n. Consequently, for a given radio coverage overlap between cell A and cell B, the first vendor implementation can have an entry in the neighbor relation table of cell B noting the neighbor relation (B→A), whereas the second vendor implementation may not have this entry in the relevant neighbor relation table. As a result, the coverage overlap between the two neighboring cells required to trigger handovers between the cells becomes vendor dependent, and as such operators who buy base stations, access points, eNodeBs, etc., from multiple vendors can have difficulties achieving consistent behavior of the automatic neighbor relation function in their wireless communications network, on the one hand, and developing consistent and efficient network design, network dimensioning, and network optimization guidelines and procedures applicable across different vendor base station, access point, NodeB, eNodeB, etc., solutions, on the other hand. Similarly, the conditions for removal of a neighbor relation from the neighbor relations table by an automatic neighbor relation function can also be proprietary. Second, the OAM typically is typically informed about the actions of the ANR function but generally does not have access to the user equipment (UE) measurements of detected cells. The user equipment (UE) measurements typically contain valuable information that the OAM can use to update the constraints on the ANR function and for other functionalities, such as interference management and coverage and capacity optimization. In order to address these two specific areas, the claimed subject matter extends the current baseline ANR function into a more elaborate framework for the management of the ANR function.

In order to provide better control of the ANR function and better consistency between vendor implementations the claimed subject matter provides neighbor addition (NA) and/or neighbor removal (NR) thresholds. These thresholds can allow for the creating new or removing existing neighbor relations by the ANR function. Typically the thresholds can be configured in the OAM and sent to the ANR function situated in the base station, Node B, Evolved Node B (eNodeB), or access point. Moreover, the claimed subject matter can allow the OAM to receive or obtain reports of the user equipment (UE) measurements of detected cells from the ANR function in the form of neighbor detection (ND) reports, and further the claimed subject matter provides the criteria for dispatching the neighbor detection (ND) reports to the OAM. By undertaking the foregoing, the claimed subject matter allows the OAM to better update the constraints on the ANR function and/or use the neighbor detection reports for additional purposes.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
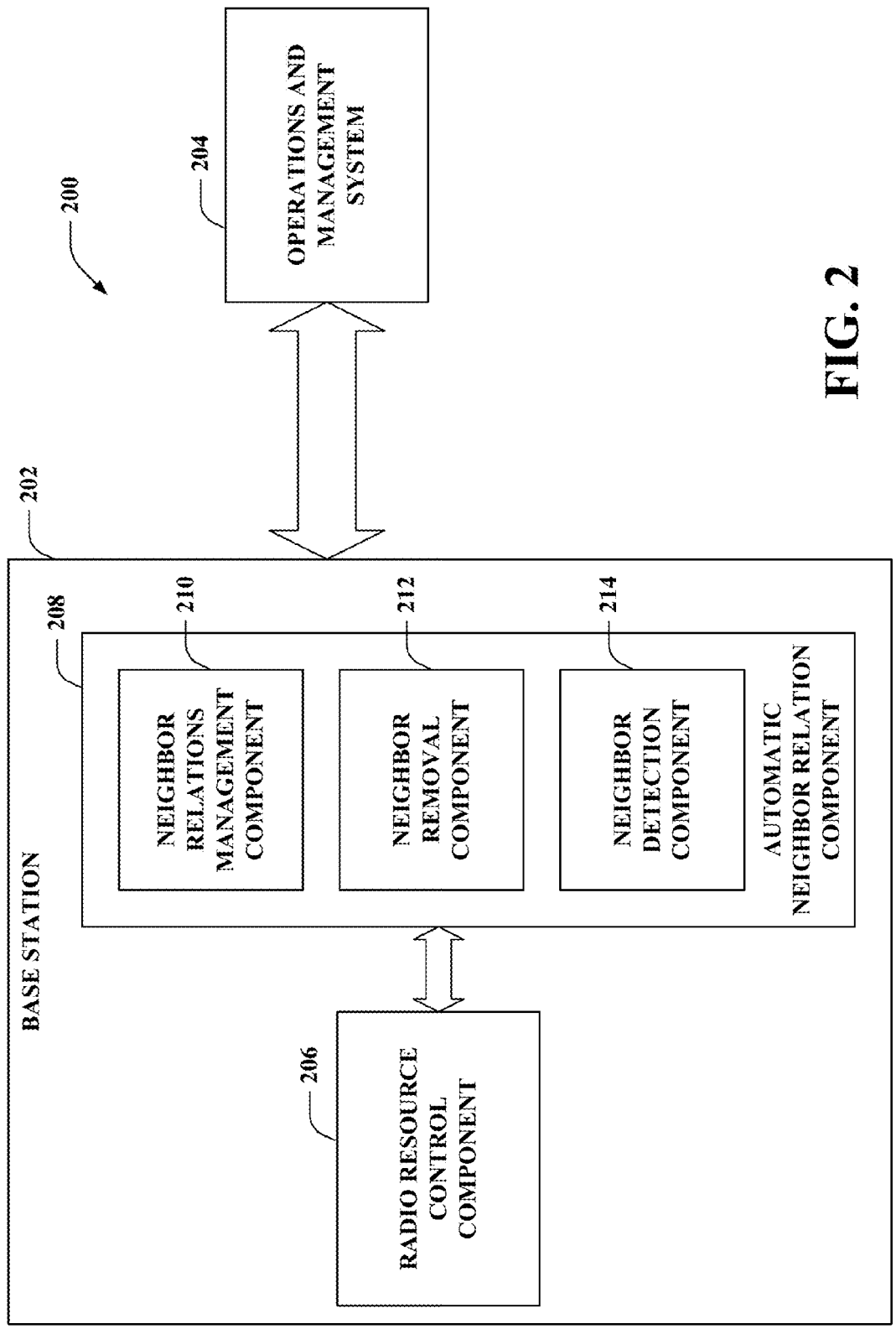
FIG. 2 is an illustration of an example system that effectuates management of automatic neighbor relation functions in wireless networks.

FIG. 2 illustrates a system 200 that effectuates management of automatic neighbor relation functions in wireless networks. System 200 can include base station 202 that can typically be employed to communicate directly with one or more mobile device, access terminal, or other user equipment (not shown) and further can be in continuous and/or operative or sporadic and/or intermittent communication with operations and management system 204. Since the basic functionality of base station 202 has been elucidated above, a detailed description of such features has been omitted for the sake of brevity and conciseness. Nevertheless, as illustrated base station 202 can also include radio resource control component 206 that can be responsible for handling the control plane signaling of layer 3 between the one or more mobile device, access terminal, or other user equipment and the universal mobile telecommunications system terrestrial radio access network, and further can perform functions for connection establishment and release, broadcast of system information, radio bearer establishment/reconfiguration and releases, radio resource control connection mobility procedures, paging notification and release, and outer loop power control, for example. Additionally, radio resource control component 206 can also receive measurement requests from automatic neighbor relation component 208 and in response send measurement reports to automatic neighbor relation component 208 for further analysis and/or processing.

As intimated above, base station 202 can also include automatic neighbor relation component 208 that can provide and/or effectuate a automatic neighbor relations (ANR) function that, in conjunction with other components associated or included within automatic neighbor relation component 208, can construct and/or update a set of neighbor relations using access terminal or user equipment measurements of detected cells reported by radio resource control component 206 as well as other internal information (e.g., counters), in accordance with one or more aspects set forth herein. In one aspect, the set of neighbor-relations can be organized into a neighbor relations table (NRT). Further, automatic neighbor relation component 208 can also update operations and management system 204 about actions performed by the ANR function and can in response receive and/or solicit from operations and management system 204 neighbor relations that should be added or removed as well as constraints that can be applied to neighbor relations.

As illustrated, automatic neighbor relation component 208 can include neighbor relations management component 210 that can receive or solicit from, operations and management system 204, neighbor relations that should be added and/or removed by neighbor relations management component 210. Further neighbor relations management component 210 can also dispatch neighbor detection reports to operations and management system 204 for further processing and/or analysis. Neighbor detection reports can be sent by automatic neighbor relation component 208 and typically include user equipment measurements of detected cells. It should be noted, without limitation or loss of generality, that operations and management system 204 can configure or define the criteria that should be employed by automatic neighbor relation component 208 to send the neighbor detection reports. The neighbor detection reports dispatched by automatic neighbor relation component 208 to operations and management system 204 can allow operations and management system 204 to better update the constraints that can be imposed on the automatic neighbor relation functionality and/or facility provided by automatic neighbor relation component 208. Additionally and/or alternatively, the neighbor detection reports supplied by automatic relation component 208 can be utilized for other purposes as well, such as, the self organizing network (SON) functionalities that can typically be carried on by operations and management system 204 (e.g., coverage optimization, handover optimization, etc.).

Additionally, automatic neighbor relation component 208 can also include neighbor removal component 212 that can provide input to neighbor relations management component 210 regarding neighbor relations that should be removed. Neighbor removal component 212 can employ internal information, such as internal measurements, gleaned from other components associated with base station 202, or persisted on storage media included with base station 202 in order to ascertain which neighbor relations should be removed. Additionally and/or alternatively, neighbor removal component 212 can obtain or elicit measurement reports from radio resource component 206 in order to ascertain which neighbor relations, which are typically established and/or maintained by base station 202, should be removed. Once neighbor removal component 212 has ascertained the neighbor relations that should be removed, neighbor removal component 212 can direct neighbor relations management component 210 to delete or remove the identified neighbor relations.

The ability of the operations and management system 204 to remove a neighbor relation or to request a removal of a neighbor relation by the ANR function in the base station can be required in several practical scenarios. In the first illustrative scenario, a cell can gave at least two cells with identical physical cell identifier (PCID) as its neighbors. In this case, as soon as one of the two cells with identical PCIDs triggers the addition of a new neighbor relation, the other cell with the identical PCID will never be detected. This failure condition can arise when the latter is the genuine neighboring cell, whereas the former is an interloper or interferer. When this happens, the handovers to the genuine neighboring cell will not be possible, resulting in high call failure rates, poor user experience, and revenue loss. Accordingly, operations and management system 204 needs a mechanism to direct neighbor removal component 212 to prevent neighbor relations associated with interfering or colliding neighbor cells from being established or maintained by automatic neighbor relation component 208. Conversely, operations and management system 204 also needs a complementary mechanism to add neighbor relations associated with the genuine neighbor cell or request its addition from automatic neighbor relation component 208. In a further illustrative scenario, PCIDs of two neighbor cells can be swapped wherein the automatic neighbor relation component 208 associated with base station 202 can, in this instance, be unaware of the swap, and as such base station 202 will route handovers to the wrong cell, causing handover failures and/or cell drops. This faulty condition can be rectified by allowing operations and management system 204 to remove the neighbor relations or request their removal from the automatic neighbor relation component 208. In yet a further illustrative scenario, the wireless operator can decide to shut down a cell from the network permanently. The neighbor relations associated with the shutdown cell should be removed from all base stations in which they are maintained so that its PCID can be re-used. Allowing the operations and management system 204 a mechanism to remove the retired cell can increase resource utilization efficiency on the network. In another illustrative scenario, the operations and management system 204 can have additional recently deduced information that previously was not available to base station 202, such as neighbor relations in neighboring base stations, performance measurements from neighboring base stations, performance measurements from the core network, etc., that can justify removal of a neighbor relation.

Further, automatic neighbor relation component 208 can also include neighbor detection component 214 that can receive or obtain measurement reports of detected cells from radio resource control component 206 and can thereafter utilize the received management reports to identify neighbor relations that should. Upon identifying neighbor relations that should be added, neighbor detection component 214 can indicate to neighbor relations management component 210 to add a neighbor relation associated with the identified neighbor.

In order to provide better control over the automatic neighbor relation functionality effectuated by automatic neighbor relation component 208 and better consistency between multiple vendors' implementations, the claimed subject matter, and in particular, automatic neighbor relation component 208 can utilize neighbor addition and/or neighbor removal thresholds. These thresholds allow for the addition of new and removal of existing neighbor relations. The thresholds (e.g., neighbor addition threshold and/or neighbor removal threshold) can be ascertained and/or configured by operations and management system 204, and can thereafter be directed to neighbor relations management component 210. Typically and in accordance with an aspect of the claimed subject matter, the neighbor addition and/or removal thresholds can be defined by the number of times that a neighboring cell has or has not been reported in measurement reports supplied by radio resource control component 206 during a fixed interval of time. For example, operations and management system component 204 can direct automatic neighbor relation component 208 and its affiliated components that if a neighboring cell has been reported in measurement reports supplied by radio resource control component 206 more than ten times in the last 72 hours that a new neighbor relation associated with such a neighboring cell should be. Similarly, neighbor removal threshold can be defined by the number of times that a neighboring cell has not been reported in measurement reports supplied by radio resource control component 206 during a fixed period of time. For instance, operations and management control component 206 can direct automatic neighbor relation component 208, and its associated components, that if a neighboring cell has not been reported in measurement reports received from radio resource control component 206 at least ten times within the last 72 hours, that a neighbor relation associated with such a neighboring cell is a good candidate for removal.

Additionally and/or alternatively and in accordance with a further aspect of the claimed subject matter, the neighbor addition and/or removal thresholds can be defined by the number of times that a neighboring cell has or has not been reported in measurement reports supplied by radio resource control component 206 and further identification can be made as to the number of instances within the period of time that the detected cell quality exceeded or fell below a quality cutoff. For instance, operations and management system 204 can direct automatic neighbor relation component 208 and its associated components to add a neighbor relation when a neighboring cell has been reported as having exceeded a quality cutoff a fixed number of times (e.g., 5) within a fixed period of time (e.g., 24 hours). Conversely, operations and management system 204 can indicate to automatic neighbor relation component and its affiliated components that a neighbor relation associated with a neighboring cell that has been reported as not havening exceeded the quality cutoff a fixed number of times (e.g., 5) within a fixed period of time (e.g., 24 hours) should be removed. In this manner, a neighbor relation can be established or removed between cells controlled or serviced by the same base station (e.g., base station 202).

It should be noted without limitation or loss of generality that the one or more performance measurements employed herein relate to the user equipment reports of detected cells. These performance measurement reports can be employed to enhance the ability of the operations and management system 204 to effectively manage or manipulate the automatic neighbor relation components associated with the one or more base stations subject to the control of operations and management system 204. The performance measurement can track (e.g., count) one or more of the following measurements, that include (i) the number of times each cell was reported by user equipment; (ii) maximum, average, or other indicia of signal strength of each reported cell; (iii) total number of additions and/or removals of neighbor relations; (iv) number of additions and/or removals of neighbor relations undertaken by an automatic neighbor relations component associated with a base station; (v) number of different user equipment (e.g., radio resource control connections) that reported each cell; (vi) total number of existing neighbor relations; (vii) number of neighbor relations in created by the automatic neighbor relations component; (viii) number of neighbor relations with a no remove status; (ix) number of neighbor relations with a no hand over status; (x) number of neighbor relations with a no X2 status; (xi) number of neighbor relations with an active handover status; and (xii) number of neighbor relations with an active X2 status. These performance measurements can be employed to optimize the neighbor addition and/or neighbor removal thresholds as well as to update the OAM constraints on the neighbor relations established and maintained by each base station in the wireless network.

As will be appreciated by those of moderate cognizance in this field of endeavor, one or more of the aforementioned performance measurements can also be employed for other purposes, such as coverage optimization. For instance, one or more of the performance measurements can be used by other self organizing network (SON) functions. For example, for coverage optimization, the performance measurement of the total number of existing neighbor relations can beneficially be used to identify the cells with strong other-cell interference. Additionally, one or more the foregoing performance measurements, such as the number of neighbor relations additions and/or removals by automatic neighbor relation component (e.g., automatic neighbor relation component 208) can profitably utilized to identify cells with fragmented coverage.

Figure 3:
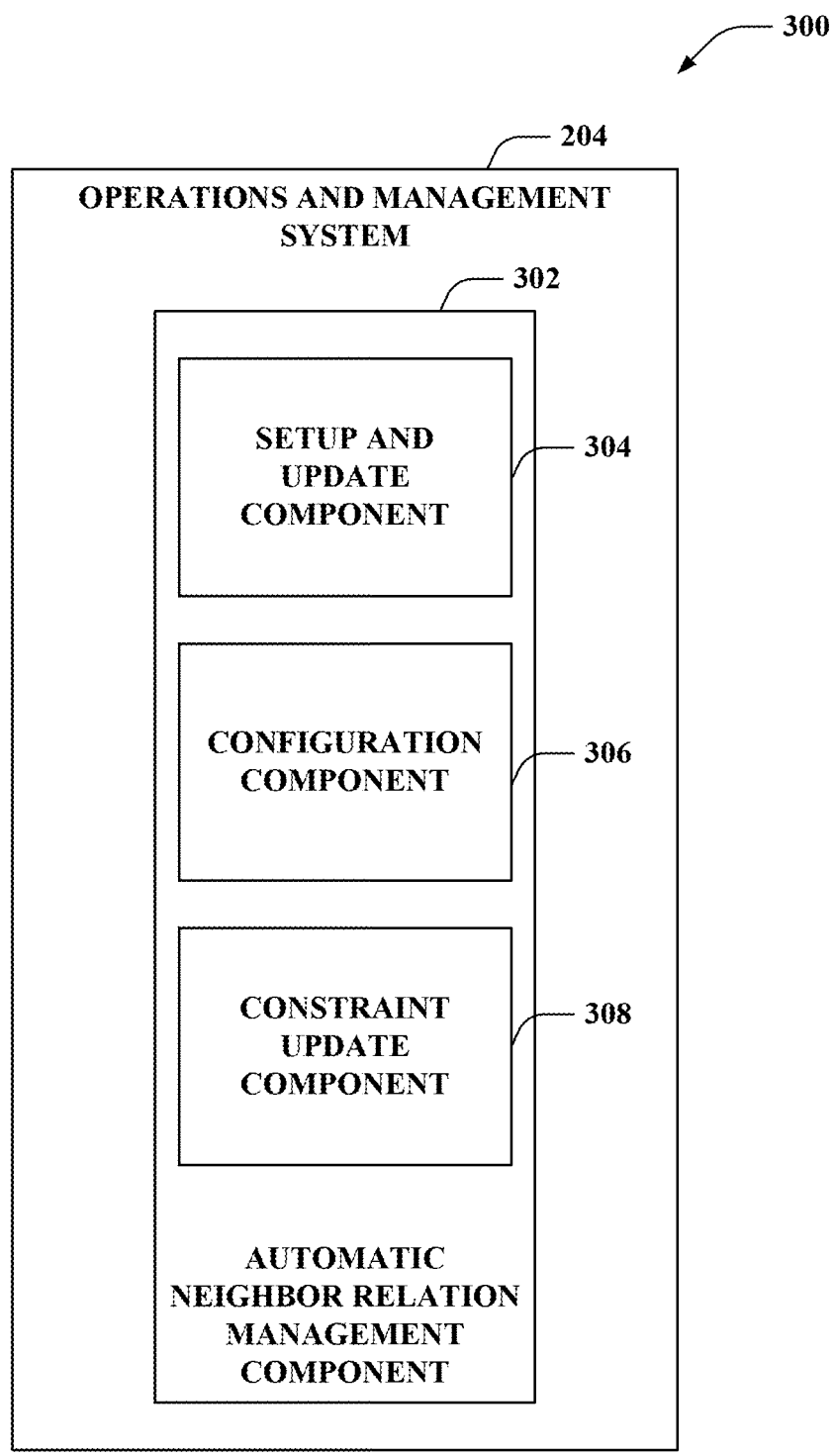
FIG. 3 is a further illustration of an example system that effectuates management of automatic neighbor relation functions in a wireless communication environment.

FIG. 3 provides further depiction 300 of operations and management system 204 that, in accordance with an aspect of the claimed subject, effectuates management of automatic neighbor relation functions in wireless networks. As illustrated, operations and management system 204 can include automatic neighbor relation management component 302 that can receive and/or solicit information about actions of the ANR function and/or neighbor detection reports from base station 202, and in particular from automatic neighbor relation component 208 included with base station 202. Additionally, automatic neighbor relation management component 302 can forward to base station 202, and more specifically, automatic neighbor relation component 208, add and/or update neighbor relation indications, neighbor removal and/or addition and detection thresholds that can be employed by automatic neighbor relation component 208 to manage, modify, add or remove neighbor relations.

Automatic neighbor relation management component 302 can include setup and update component 304, configuration component 306, and constraint update component 308. In accordance with one aspect of the claimed subject matter, based at least in part on input received from a neighbor relations management component (e.g., neighbor relations management component 210) associated with an automatic neighbor relation component included with a base station (e.g., automatic neighbor relation component 208 included with base station 202) and input received from constraint update component 308, setup and update component 304 can dispatch add and/or update neighbor relation indications to the base station in communication with operations and management system 204, and more particularly, setup and update component can supply add and/or update neighbor relation indications to the neighbor relations management component of the base station in communications with operations and management system 204. The add and/or update neighbor relation indications dispatched to the base station can on receipt be utilized to establish or add neighbor relations and/or update neighbor relations, wherein the neighbor relations are maintained by the base station. It should be noted without limitation or loss of generality and as will be appreciated by those moderately conversant in this field of endeavor, that each base station that is in correspondence with operations and management system 204 will typically maintain its own neighbor relations.

Automatic neighbor relation management component 302 can also include configuration component 306 that can provide to the base station in data interchange with operations and management component 204, neighbor detection, neighbor addition, and/or neighbor removal thresholds, that the base station, and in particular, the associated automatic neighbor relation component (e.g., automatic neighbor relation component 208 included with base station 202), can employ to detect, add, and/or remove neighbor relations established and/or maintained by the base station. In particular, configuration component 306 can supply neighbor removal thresholds to neighbor removal component 212 and neighbor detection and neighbor addition thresholds to neighbor detection component 214.

Further, automatic neighbor relation management component 302 can also include constraint update component 308 that can receive or solicit input from a neighbor relations management component and neighbor detection reports from an automatic neighbor relation component associated with a corresponding or communicating base station (e.g., automatic neighbor relation component 208 included with base station 202). In particular, constraint update component 308 can obtain input from a neighbor relation management component (e.g., neighbor relation management component 210) and further can obtain neighbor detection reports from a neighbor detection component (e.g., neighbor detection component 214) each of neighbor relations management component and neighbor detection component can be affiliated with the base station with which operations and management system 204 is in correspondence with. Once constraint update component 308 has obtained input from a neighbor relation management component and/or neighbor detection reports it can, possibly after analysis and/or further processing, provide to setup and update component 304 input that setup and update component 304 can utilized in providing neighbor relation indications to the corresponding base station that on receipt can be used to establish or add neighbor relations and/or update neighbor relations maintained by the base station.

Figure 4:
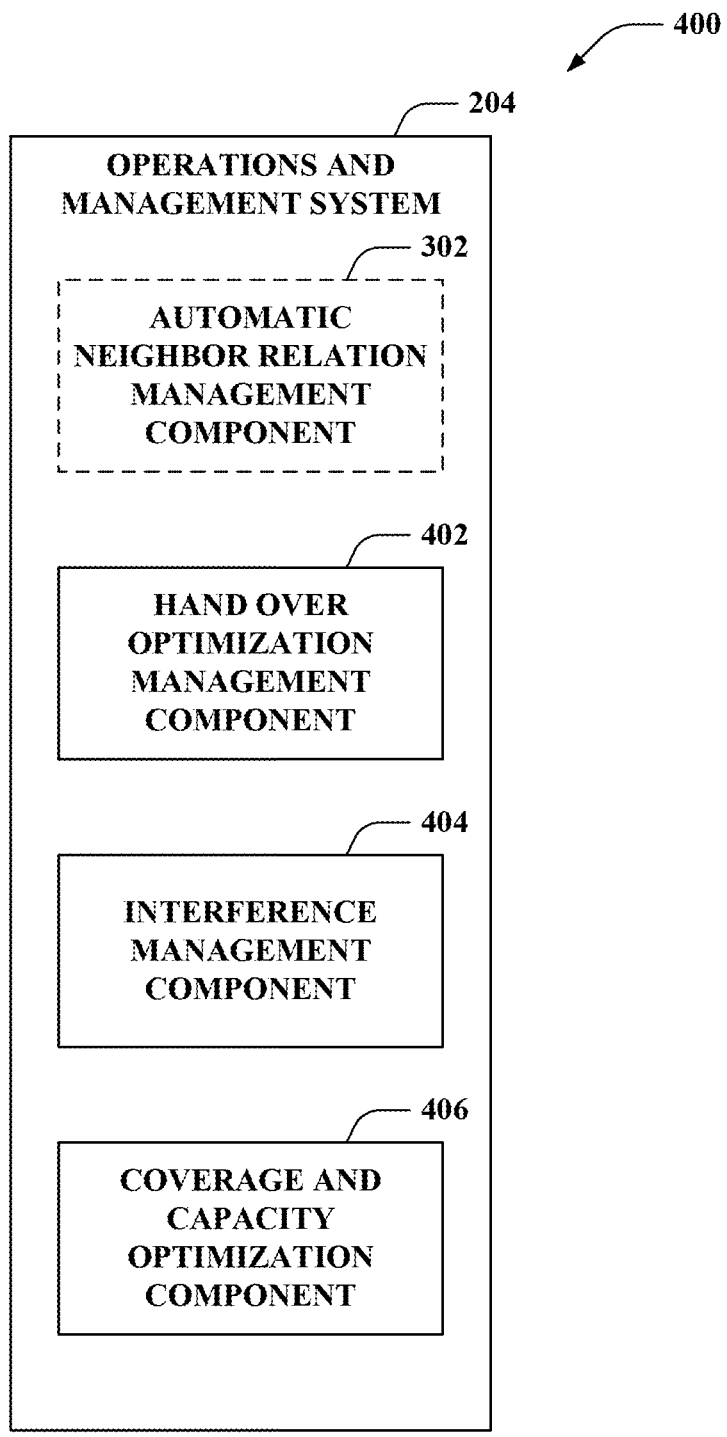
FIG. 4 is another illustration of an example system that effectuates management of automatic neighbor relation functions in wireless networks.

FIG. 4 provides yet further depiction 400 of operations and management system 204 that, in accordance with an aspect of the claimed subject, effectuates management of automatic neighbor relation functions in wireless networks. As depicted operations and management system 204, in addition to automatic neighbor relation management component 302, the functionalities and facilities of which have been discussed above, can also include hand over optimization management component 402, interference management component 404, and coverage and capacity optimization component 406, each of which individually and/or in combination can provide self organizing network functions to the wireless communications network. In accordance with this aspect of the claimed subject matter, hand over optimization management component 402, interference management component 404, and coverage capacity optimization component 406 can provide various functionalities and/or facilities that can be enhanced through utilization of feedback or feed forward received from automatic neighbor relation components (e.g., automatic neighbor relation component 208) associated with base stations serviced by operations and management system 204. In particular, neighbor detection reports from neighbor detection components (e.g., neighbor detection component 214) associated with automatic neighbor relation components (e.g. automatic neighbor relation component 208) and included with base stations (e.g., base station 202) can be supplied to, or solicited by, hand over optimization management component 402, interference management component 404, and/or coverage and capacity optimization component 406.

Referring to FIGS. 5-9, methodologies relating to effectuating management of automatic neighbor relation functions in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 5:
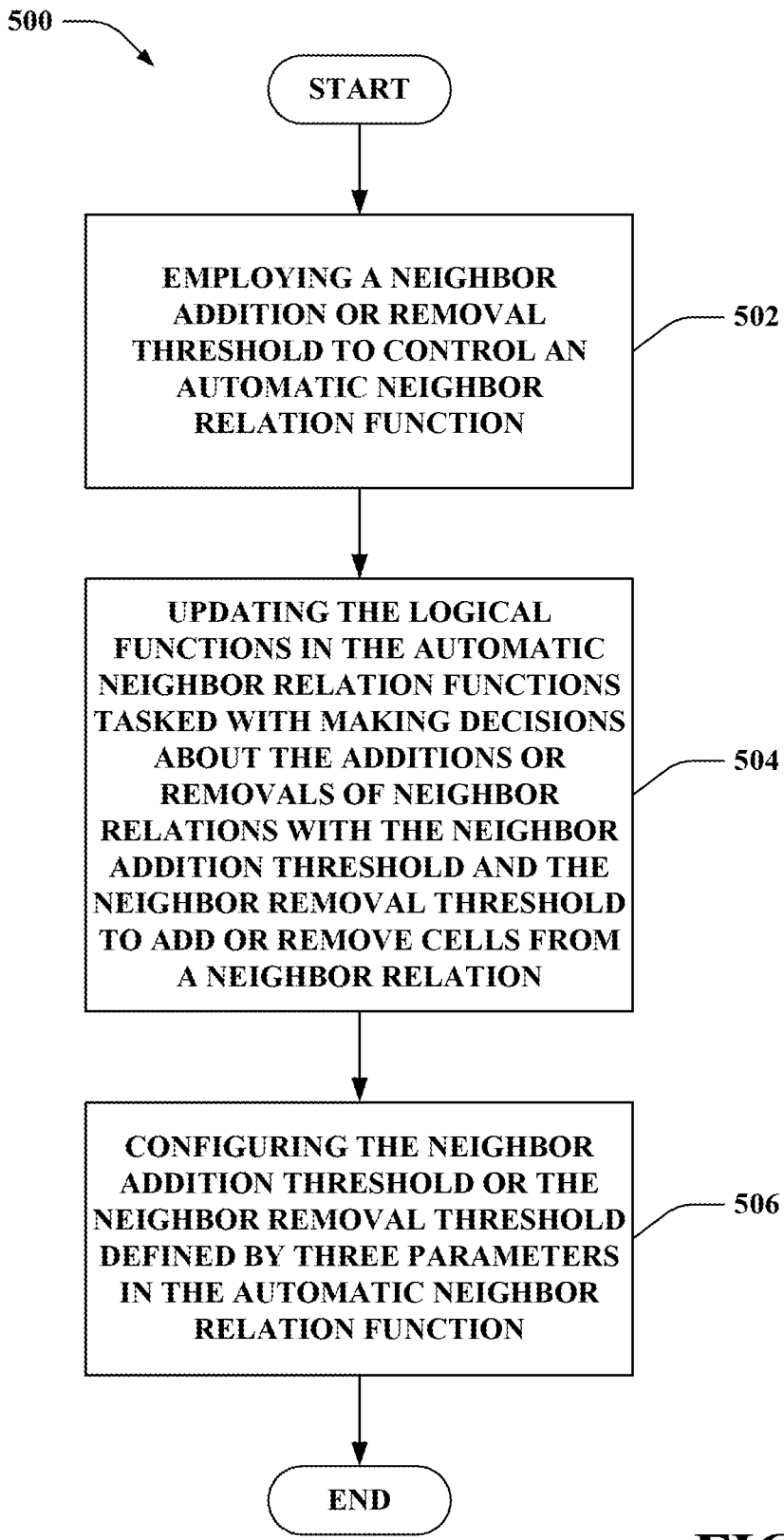
FIGS. 5-9 are illustrations of example methodologies that facilitates management of automatic neighbor relation functions in wireless networks.

With reference to FIG. 5, illustrated is a methodology 500 that facilitates management of automatic neighbor relation functions in wireless networks. Method 500 can commence at 502 where neighbor addition and/or neighbor removal thresholds can be utilized to control an automatic neighbor relation function associated with a base station. At 504 the logical functions in the automatic neighbor relation function tasked with making decisions about the additions and/or removals of neighbor relations can be updated with the neighbor addition threshold and/or the neighbor removal threshold to add or remove neighbor relations. At 506 the neighbor addition threshold or the neighbor removal threshold can be configured to be defined by three parameters in the automatic neighbor relation function.

Figure 6:
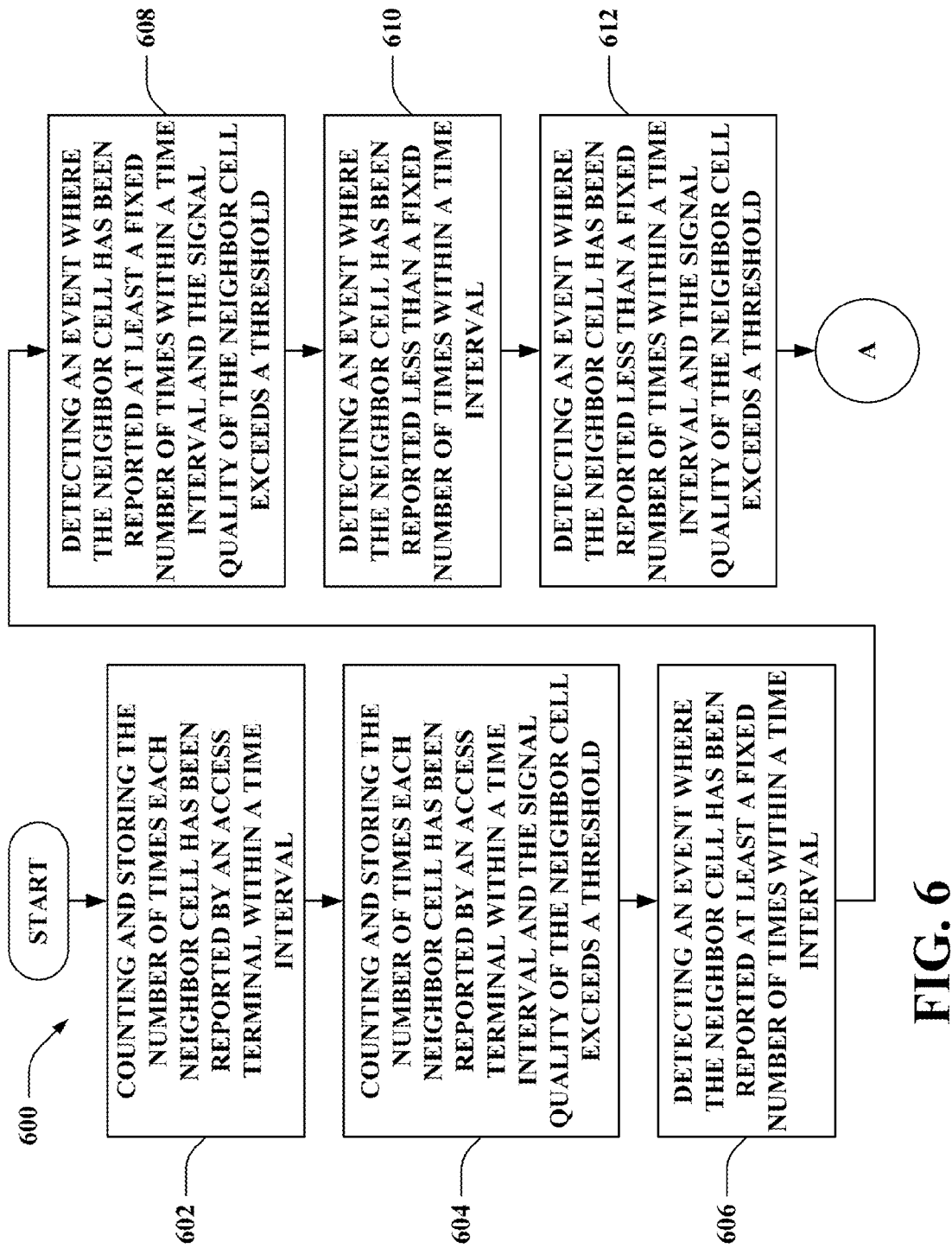

FIG. 6 illustrates a methodology 600 that facilitates or effectuates management of automatic neighbor relation functions in wireless networks in accordance with an aspect of the claimed subject matter. Method 600 can commence at 602 where the number of times that each neighbor cell has been reported by an access terminal within a fixed period of time can be counted and the results persisted or stored. At 604 the number of times that each neighbor cell has been reported by an access terminal within a time interval and with a signal quality that exceeds a threshold can be counted and stored. At 606 a neighbor cell that has been reported at least a fixed number of times within a fixed period of time can be detected. At 608 a neighbor cell that has been reported at least a fixed number of times within a time certain (e.g., finite or fixed time period) with a cell quality that exceeds a threshold can be detected. At 610 a neighbor cell that has been reported less than a fixed number of times with a definite period of time can be detected. At 612 a neighbor cell that has been reported less than a fixed number of times within a fixed period of time and that has a signal quality that exceed a threshold can be detected, after which method 600 can proceed to act A.

Figure 7:
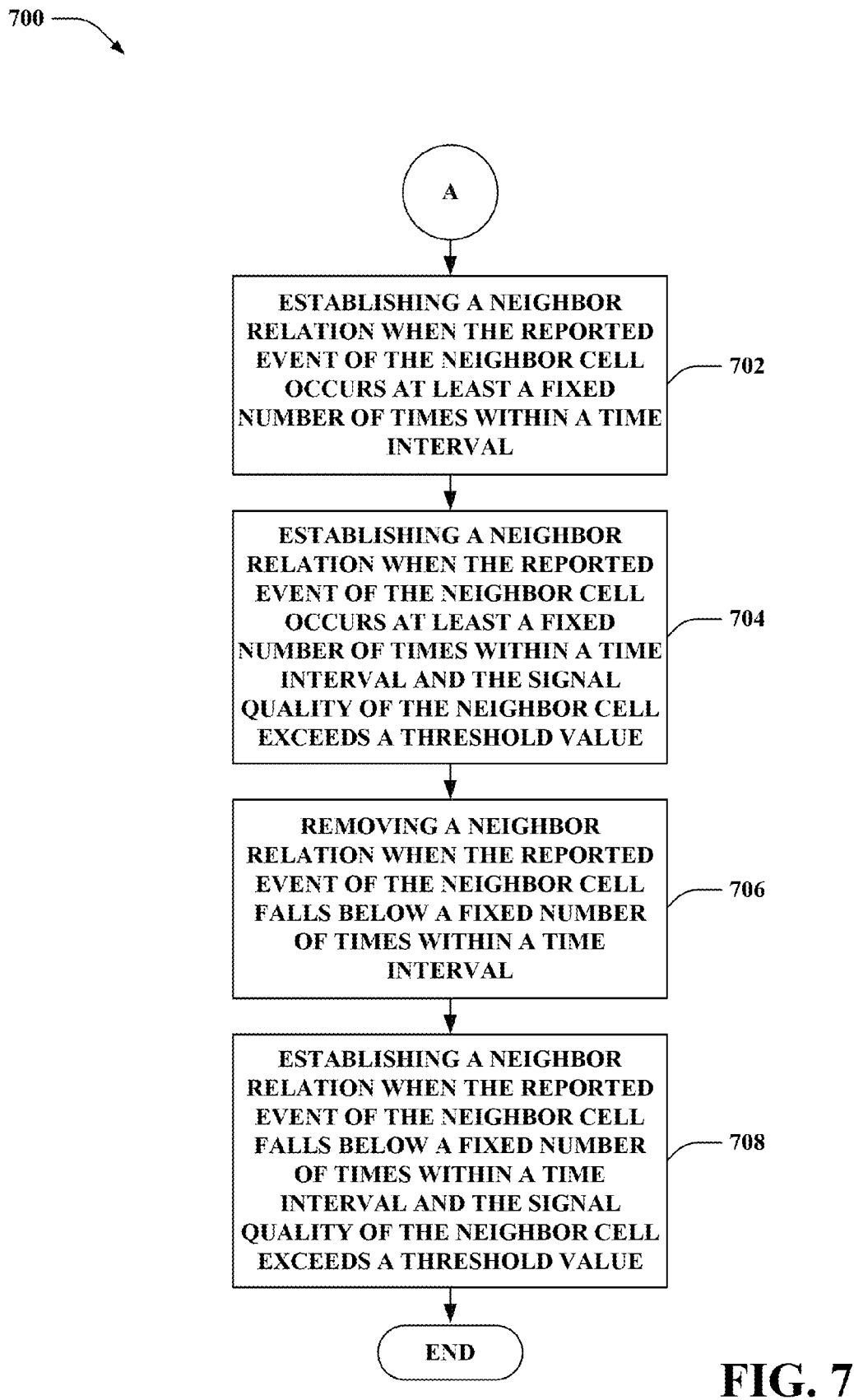

FIG. 7 illustrates a method 700 that is a continuation of the methodology depicted in FIG. 6 that actuates or facilitates management of automatic neighbor relation functions in wireless networks in accordance with an aspect of the claimed subject matter. Method 700 can commence at 702 where a neighbor relation can be established when the reports of the neighbor cell occurs at least a fixed number of times within a time interval. At 704 a neighbor relation can be established in when the reports of the neighbor cell occurs at least a fixed number of times within a fixed time interval and the signal quality of the neighbor cell exceeds a threshold value. At 706 a neighbor relation can be removed when the reported event of the neighbor cell falls below a fixed number of times within a fixed period of time. At 708 a neighbor relation can be established when a reported event falls below a fixed number of time within a fixed period of time and the signal quality of the neighbor cell exceeds a threshold value.

Figure 8:
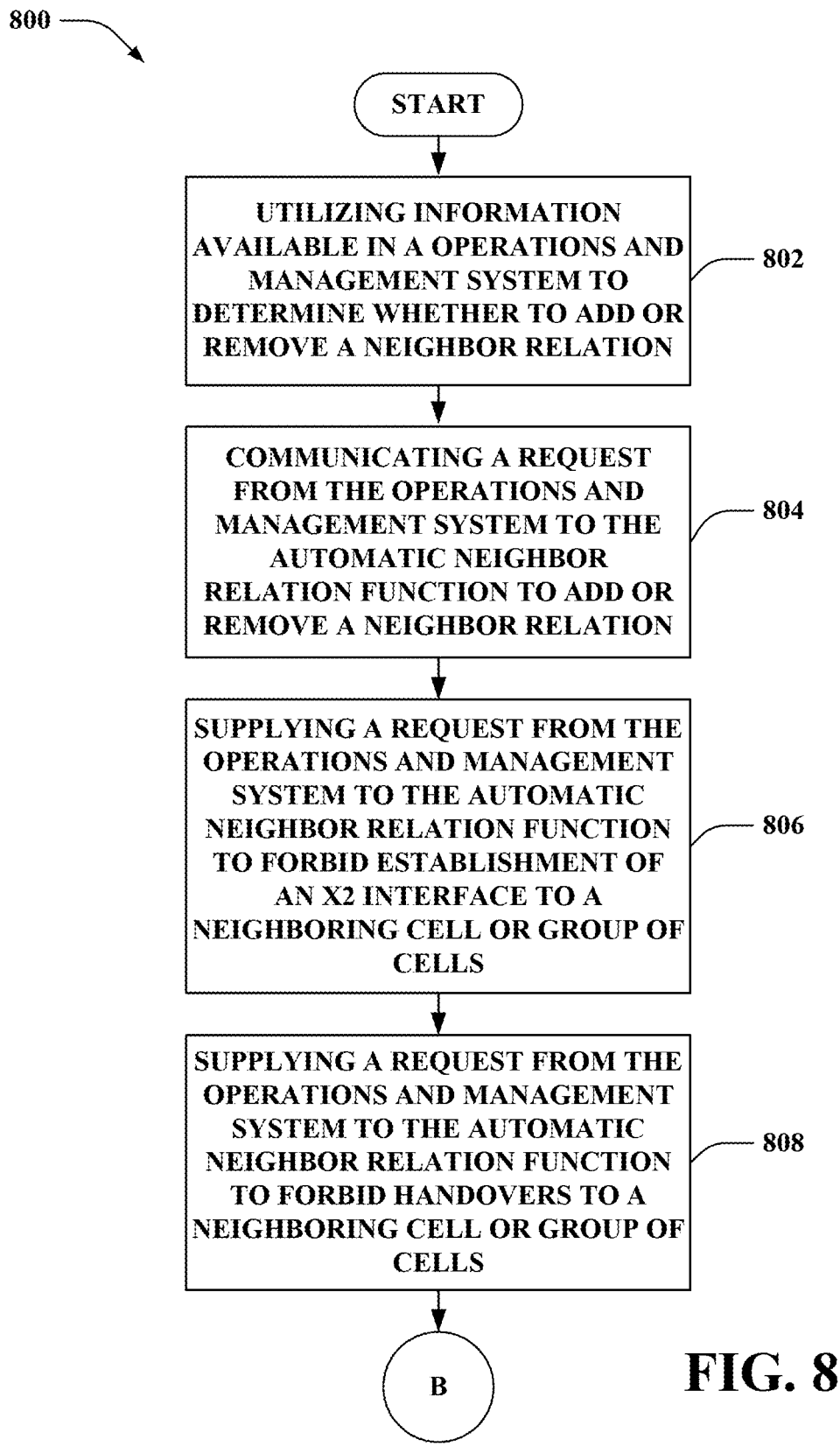

FIG. 8 illustrates a methodology 800 that facilitates management of automatic neighbor relation functions in wireless networks in accordance with a further aspect of the claimed subject matter. Method 800 can commence at 802 where information available in an operations and management system can be utilized to determine whether or not to add or remove a neighbor relations. At 804 a request from the operations and management system to an automatic neighbor relation function included with a base station can be communicated, the request can be used to add or remove a neighbor relation. At 806 a request from the operations and management system to the automatic neighbor relation function can be supplied, the request can be utilized to forbid establishment of an X2 interface to a neighboring cell or group of cells. At 808 a request from the operations and management system to the automatic neighbor relation function can be supplied, the request can be employed to forbid handovers to a neighboring cell or group of cells.

Figure 9:
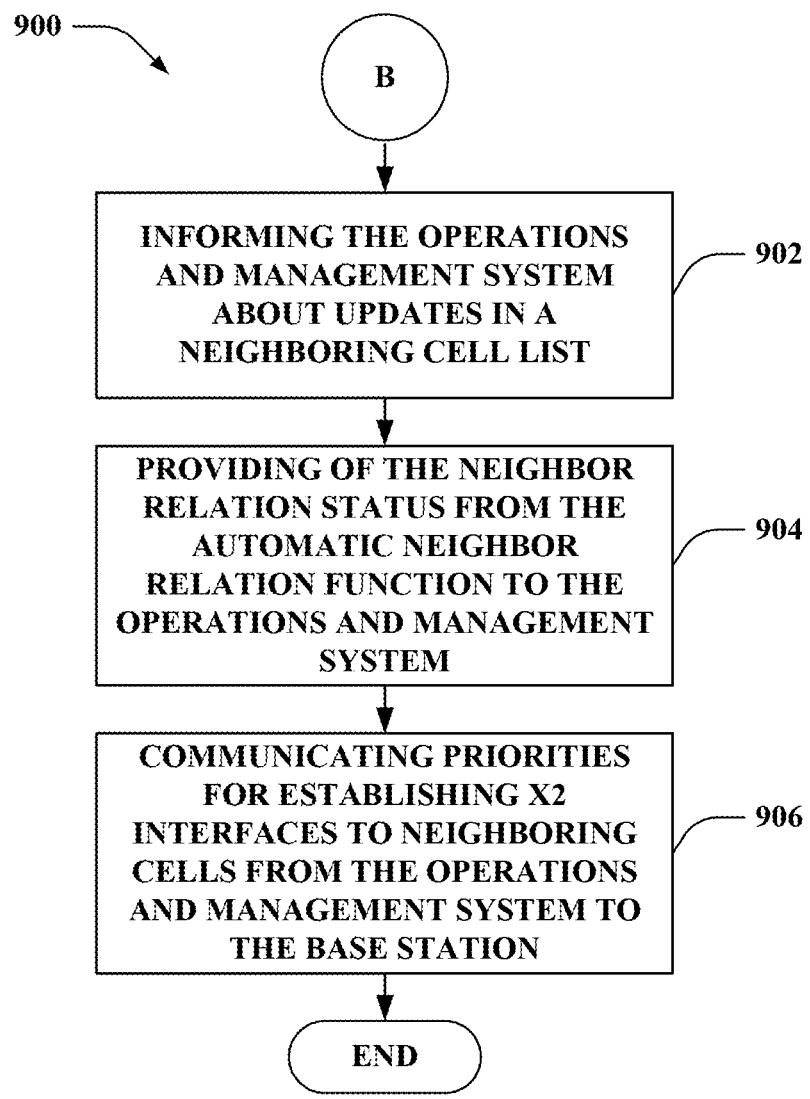

FIG. 9 illustrates a method 900 that is a continuation of the methodology depicted in FIG. 8 that actuates or facilitates management of automatic neighbor relation functions in wireless networks in accordance with an aspect of the claimed subject matter. Method 900 can commence at 902 where the operations and management system can be informed about updates in a neighboring cell list. At 904 the automatic neighbor relation function can provide a neighbor relation status to the operations and management system. At 906 priorities for establishing X2 interfaces to neighboring cells can be communicated from operations and management system to the base station that establishes and/or maintains the neighbor relations table or set of existing neighbor relations.

FIG. 10 depicts an illustrative neighbor relations table 1000 that can be established and/or maintained by an automatic neighbor relation component associated with a base station. As can be observed, the neighbor relations table 1000 can include rows and columns, wherein each row defines a neighbor relation wherein each neighbor relation includes a local cell identifier, a target cell identifier, a no remove flag (where if the no remove flag is set, the base station through its associated automatic neighbor relations component should not remove the neighbor relation from the table), a no handover flag (where if the no hand over flag is set, the base station through its affiliated automatic neighbor relations component should prevent the neighbor relation from being used for handover purposes), and a no X2 flag (where if the no X2 flag is set, no X2 interface is to be established towards the base station parenting the cell). In one aspect, no X2 flags and/or any other OAM controlled attributes associated with X2 connections can be maintained in a separate table, in which each row defines a neighbor relation on a base station level. A neighbor relation on a base station level may include at least a local base station identifier, a target base station identifier and a no X2 flag.

It will be appreciated that, in accordance with one or more aspects described herein, inferences can be made regarding management of automatic neighbor relation functions in wireless networks. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
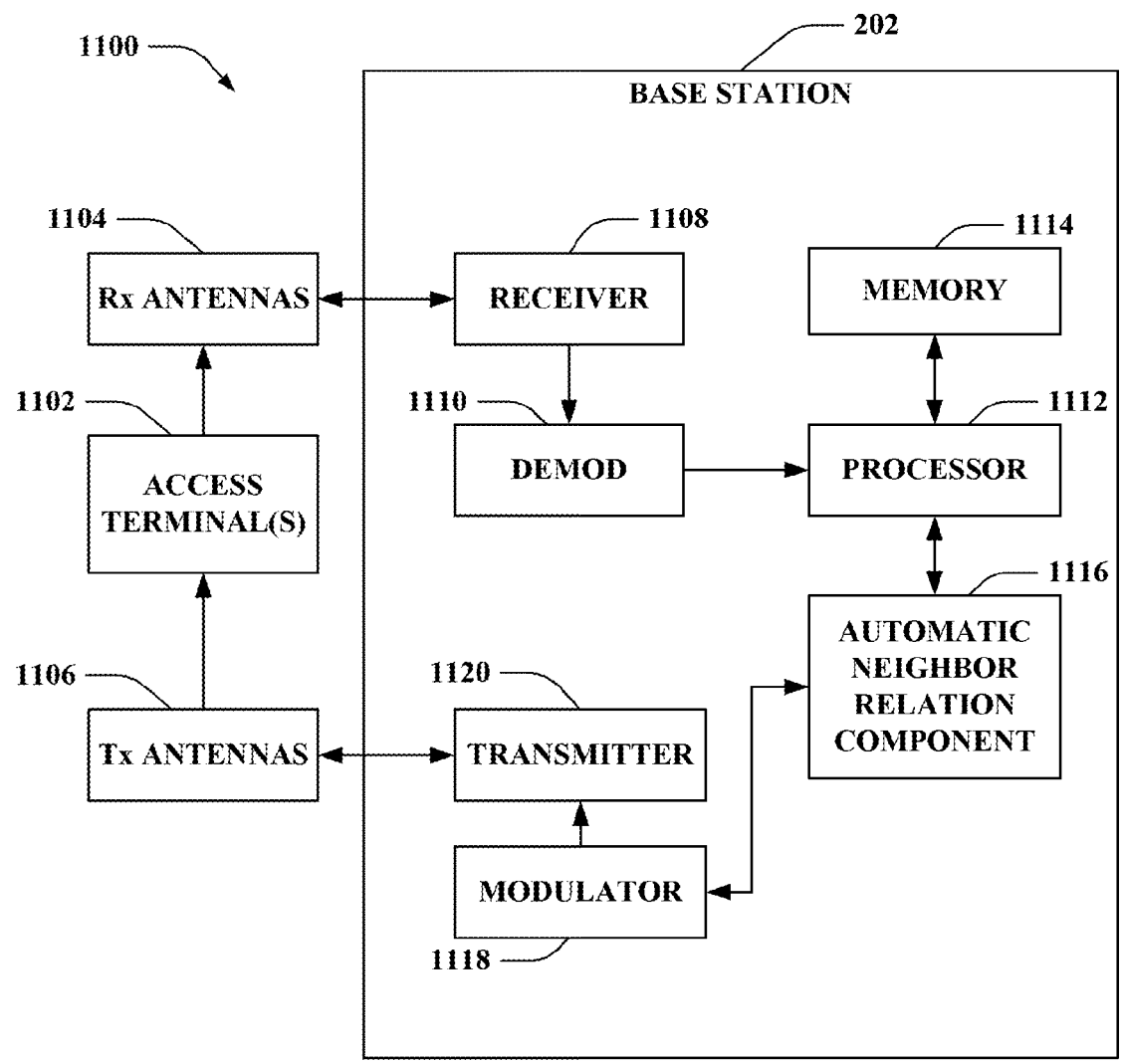
FIG. 11 is an illustration of an example system that facilitates allocating resource blocks to access terminal(s) via employing a flexible signaling scheme in a wireless communication environment.

FIG. 11 is an illustration of a system 1100 that facilitates management of automatic neighbor relation functions in wireless networks. System 1100 comprises a base station 202 (e.g., access point, . . . ) with a receiver 1108 that receives signal(s) from one or more access terminals through a plurality of receive antennas 1104, and a transmitter 1120 that transmits to the one or more access terminals 1102 through a transmit antenna 1106. Receiver 1108 can receive information from receive antennas 1104 and is operatively associated with a demodulator 1110 that demodulates received information. Demodulated symbols are analyzed by a processor 1112 dedicated to analyzing information received by receiver 1108 and/or generating information for transmission by a transmitter 1120, a processor that controls one or more components of base station 202, and/or a processor that both analyzes information received by receiver 1108, generates information for transmission by transmitter 1108, and controls one or more components of base station 202, and which is coupled to a memory 1114 that stores data to be transmitted to or received from access terminal(s) 1102 (or a disparate base station (not shown)) and/or any other suitable information related to performing the various actions and functions set forth herein. Processor 1112 is further coupled to an automatic neighbor relation component 1116 that facilitate transmission of circuit switched voice over packet switched networks. Further, automatic neighbor relation component 1116 can provide information to be transmitted to a modulator 1118. Modulator 1118 can multiplex a frame for transmission by a transmitter 1120 through antennas 1106 to access terminal(s) 1102. Although depicted as being separate from the processor 1112, it is to be appreciated that automatic neighbor relation component 1116 and/or modulator 1118 can be part of processor 1112 or a number of processors (not shown).

Figure 12:
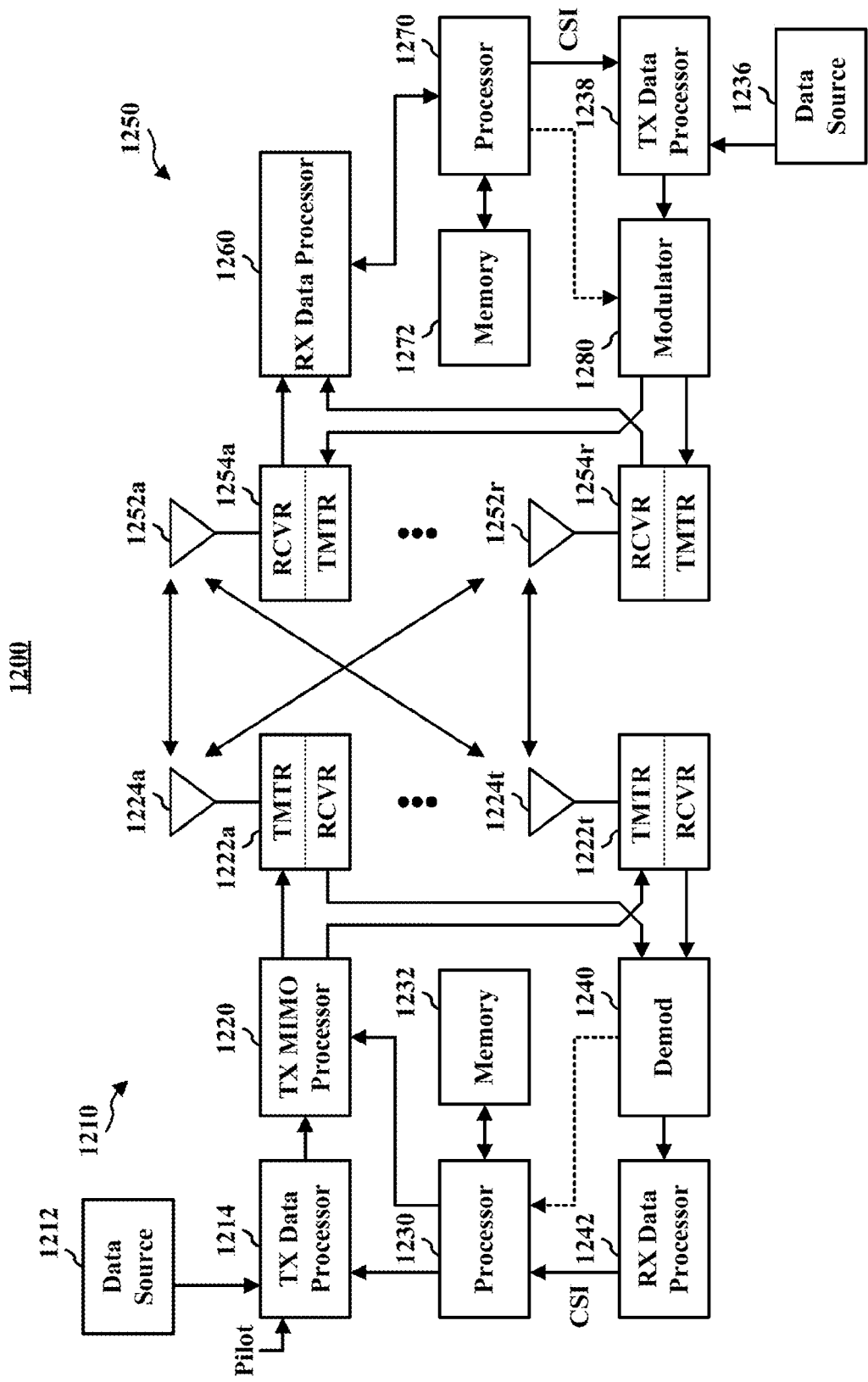
FIG. 12 is an illustration of an example wireless network environment that can be employed in conjunction with the various systems and methods described herein.

FIG. 12 shows an example wireless communication system 1200. The wireless communication system 1200 depicts one base station 1210 and one access terminal 1250 for sake of brevity. However, it is to be appreciated that system 1200 can include more than one base station and/or more than one access terminal, wherein additional base stations and/or access terminals can be substantially similar or different from example base station 1210 and access terminal 1250 described below. In addition, it is to be appreciated that base station 1210 and/or access terminal 1250 can employ the systems (FIGS. 1-4) and/or methods (FIGS. 5-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At access terminal 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which available technology to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from access terminal 1250 are received by antennas 1224, conditioned by receivers 1222, demodulated by a demodulator 1240, and processed by a RX data processor 1242 to extract the reverse link message transmitted by access terminal 1250. Further, processor 1230 can process the extracted message to determine which precoding matrix to use for determining the beamforming weights.

Processors 1230 and 1270 can direct (e.g., control, coordinate, manage, etc.) operation at base station 1210 and access terminal 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bidirectional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
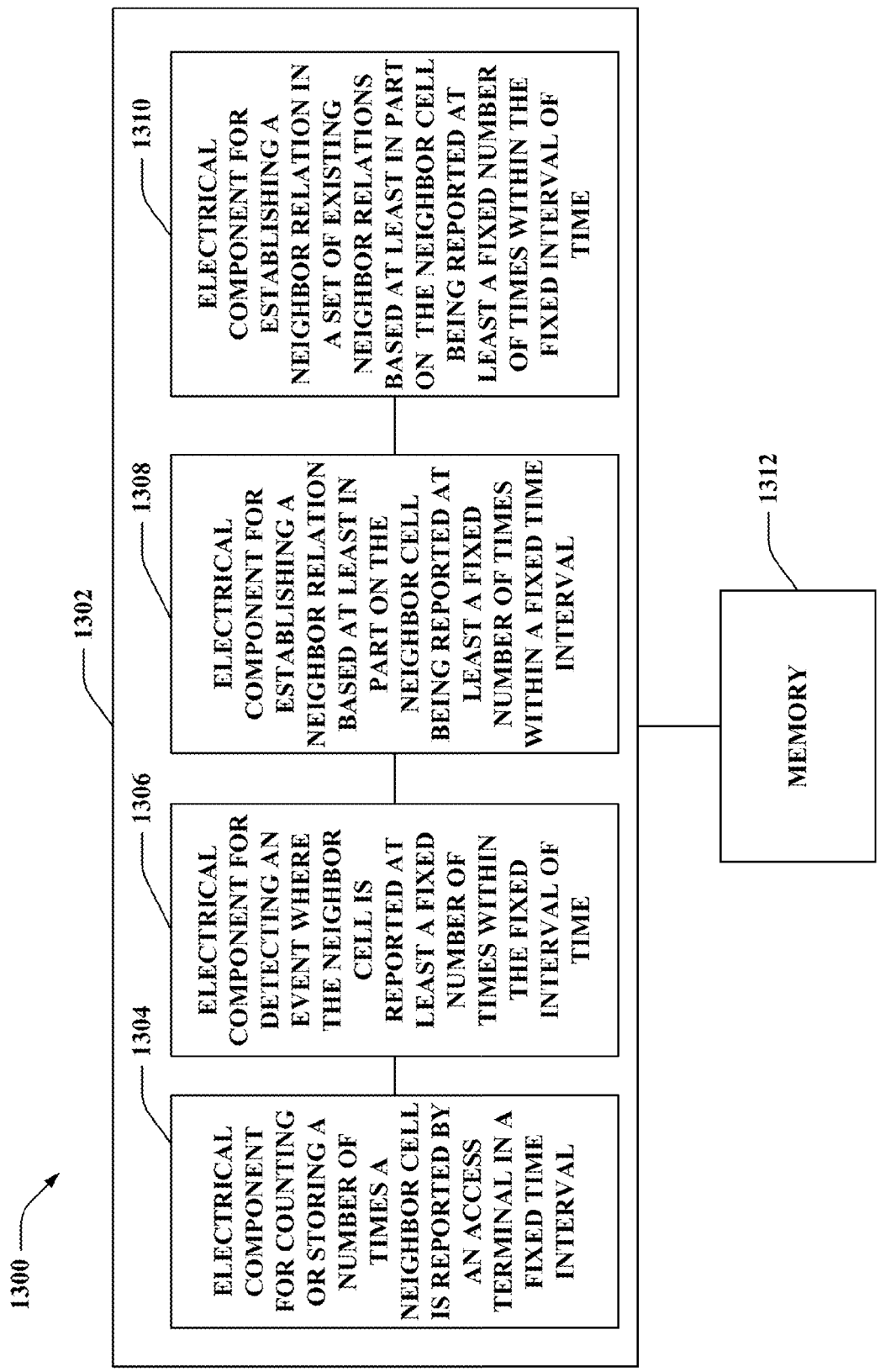
FIG. 13 is an illustration of an example system that enables utilizing a flexible scheme for signaling resource block assignments in a wireless communication environment.

With reference to FIG. 13, illustrated is a system 1300 that facilitates management of automatic neighbor relation functions in wireless networks in a wireless communication environment. For example, system 1300 can reside at least partially within a base station. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for counting or storing a number of times a neighbor cell is reported by an access terminal in a fixed time interval 1304. Further, logical grouping 1302 can include an electrical component for detecting an event where the neighbor cell is reported at least a fixed number of times within the fixed interval of time 1306. Additionally, logical grouping 1302 can include an electrical component for establishing a neighbor relation based at least in part on the neighbor cell being reported at least a fixed number of times within a fixed time interval 1308. Moreover, logical grouping 1302 can comprise an electrical component for establishing a neighbor relation in a set of existing neighbor relations based at least in part on the neighbor cell being reported at least a fixed number of times within the fixed interval of time 1310. Additionally, system 1300 can include a memory 1312 that retains instructions for executing functions associated with electrical components 1304, 1306, 1308 and 1310. While shown as being external to memory 1312, it is to be understood that one or more of electrical components 1304, 1306, 1308, and 1310 can exist within memory 1312.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus operable in a wireless communications system, the apparatus comprising:
    a processor, configured for determining whether to at least one of add or remove a neighbor relation based at least in part on information associated with an operations and management system, and sending one or more of an add or remove request from the operations and management system to a base station, wherein the determination is based on a number of times that a neighboring cell has or has not been reported in a management report during a fixed interval of time; and
    a memory coupled to the processor for persisting data.

2. The apparatus of claim 1, the add or remove request utilized by the base station to at least one of establish a neighbor relation or modify a neighbor relation, the neighbor relations maintained by the base station.

3. The apparatus of claim 1, the add or remove request utilized by the base station to at least one of establish a neighbor relations table or modify the neighbor relations table, the neighbor relations table maintained by the base station.

4. The apparatus of claim 1, the processor further configured for receiving, from the base station, updates regarding a neighboring cell or group of cells.

5. The apparatus of claim 1, the processor further configured for obtaining a status of the neighbor relation maintained by the base station.

6. The apparatus of claim 1, the processor further configured for obtaining a status of the neighbor relation from a neighbor relations table maintained by the base station.

7. An apparatus operable in a wireless communications system, the apparatus comprising:
a processor, configured for determining whether to at least one of add or remove a neighbor relation based at least in part on information associated with an operations and management system, and sending one or more of an add or remove request from the operations and management system to a base station, the processor further configured for sending to the base station a request to forbid establishment of an X2 interface to a neighboring cell or group of cells; and
a memory coupled to the processor for persisting data.

8. An apparatus operable in a wireless communications system, the apparatus comprising
a processor, configured for determining whether to at least one of add or remove a neighbor relation based at least in part on information associated with an operations and management system, and sending one or more of an add or remove request from the operations and management system to a base station, the processor further configured for dispatching to the base station a request to forbid handovers to a neighboring cell or group of cells; and
a memory coupled to the processor for persisting data.

9. An apparatus operable in a wireless communications system, the apparatus comprising:
a processor configured for determining whether to at least one of add or remove a neighbor relation based at least in part on information associated with an operations and management system, and sending one or more of an add or remove request from the operations and management system to a base station, the processor further configured for dispatching one or more priority to the base station for establishing an X2 interface to a neighboring cell or group of cells; and
a memory coupled to the processor for persisting data.

10. A computer program product, comprising:
a computer-readable medium comprising:
code for ascertaining whether to add or remove a neighbor relation based at least in part on information associated with an operations and management system, wherein the ascertaining is based on a number of times that a neighboring cell has or has not been reported in a management report during a fixed interval of time; and
code for dispatching from the operations and management system an add or remove request to a base station.

11. The computer program product of claim 10, wherein the machine-executable instructions further comprising soliciting from a neighbor relations table, maintained by the base station, status information regarding a neighbor relation.

12. The computer program product of claim 10, wherein the machine-executable instructions further comprising communicating priority information for establishing an X2 interface to a neighboring cell.

13. A computer program product, comprising:
code for ascertaining whether to add or remove a neighbor relation based at least in part on information associated with an operations and management system, wherein the machine-executable instructions further comprising communicating a request to forbid establishment of an X2 interface to a neighboring cell or group of cells; and
code for dispatching from the operations and management system an add or remove request to a base station.

14. The computer program product of claim 13, wherein the machine-executable instructions further comprising communicating a request to forbid handovers to a neighboring cell or group of cells.

15. The computer program product of claim 13, wherein the machine-executable instructions further comprising communicating a request to forbid removal of the relation from a neighbor relations table maintained by the base station.

16. The computer program product of claim 13, wherein the machine-executable instructions further comprising receiving updates from the base station, the updates relate to a neighboring cell.

17. A method utilized in wireless communication systems, the method comprising:
employing a neighbor addition threshold or a neighbor removal threshold to control an automatic neighbor relation function; and
updating a logical relationship associated with the automatic neighbor relation function tasked with making decisions about cell additions or cell removals based at least in part on the neighbor addition threshold or the neighbor removal threshold, wherein the updating is based on a number of times that a neighboring cell has or has not been reported during a fixed interval of time; or
updating a logical relationship associated with the automatic neighbor relation function tasked with making decisions about cell additions or cell removals from a neighbor relations table based at least in part on the neighbor addition threshold or the neighbor removal threshold.

18. The method of claim 17, further comprising using an electronic device for employing the neighbor addition threshold or the neighbor removal threshold.

19. The method of claim 17, wherein the neighbor addition threshold is based at least in part on a number of times that a neighbor cell is reported within a fixed period of time with a signal quality that exceeds a signal quality threshold.

20. The method of claim 17, wherein the neighbor removal threshold is based at least in part on a number of times that a neighbor cell is reported within a fixed period of time with a signal quality that falls below a signal quality threshold.

21. The method of claim 17, wherein the neighbor addition threshold is based at least in part on a number of times that a neighbor cell is reported within a fixed period of time and the number of times that the neighbor cell is reported within the fixed period of time exceeds an addition threshold.

22. The method of claim 17, wherein the neighbor removal threshold is based at least in part on a number of times that a neighbor cell is reported within a fixed period of time and the number of times that the neighbor cell is reported within the fixed period of time falls below a removal threshold.

23. An apparatus operable in wireless communication systems, the apparatus comprising:

a memory that retains instructions related to counting or storing a number of times a neighbor cell is reported by an access terminal in a fixed time interval, detecting an event where the neighbor cell is reported at least a fixed number of times, and establishing a neighbor relation based at least in part on the detecting; and a processor, coupled to the memory, configured to execute the instructions retained in memory.

24. The apparatus of claim 23, wherein the neighbor relation is established or maintained by a base station.

25. The apparatus of claim 23, wherein the memory further retains instructions related to counting or storing the number of times the neighbor cell is reported by the access terminal in the fixed time interval where a signal quality of the neighbor cell exceeds a threshold.

26. The apparatus of claim 23, wherein the memory further retains instructions related to detecting the event where the neighbor cell is reported at least the fixed number of times and a signal quality of the neighbor cell exceeds a threshold.

27. The apparatus of claim 23, wherein the memory further retains instructions related to detecting the event where the neighbor cell is reported less than the fixed number of times in the fixed time interval.

28. The apparatus of claim 23, wherein the memory further retains instructions related to detecting the event where the neighbor cell is reported less than the fixed number of times in the fixed time interval and a signal quality of the neighbor cell exceeds a threshold.

29. The apparatus of claim 23, wherein the memory further retains instructions related to establishing the neighbor relation when the number of times the neighbor cell is reported by the access terminal in the fixed time interval and a signal quality of the neighbor cell exceeds a threshold.

30. The apparatus of claim 23, wherein the memory further retains instructions related to removing the neighbor relation when the neighbor cell is reported less than the fixed number of times in the fixed time interval.

31. The apparatus of claim 23, wherein the memory further retains instructions related to removing the neighbor relation when the neighbor cell is reported less than the fixed number of times in the fixed time interval and a signal quality of the neighbor cell exceeds a threshold.

32. An apparatus operable in wireless communication systems, the apparatus comprising:

a memory that retains instructions related to counting or storing a number of times a neighbor cell is reported by an access terminal in a fixed time interval, detecting an event where the neighbor cell is reported at least a fixed number of times, and establishing a neighbor relation in a neighbor relation table based at least in part on the detecting; and a processor, coupled to the memory, configured to execute the instructions retained in memory.

33. The apparatus of claim 32, wherein the neighbor relations table is established or maintained by a base station.

34. The apparatus of claim 32, wherein the memory further retains instructions related to establishing the neighbor relation in the neighbor relations table when the number of times the neighbor cell is reported by the access terminal in the fixed time interval and a signal quality of the neighbor cell exceeds a threshold.

35. The apparatus of claim 32, wherein the memory further retains instructions related to removing the neighbor relation from the neighbor relations table when the neighbor cell is reported less than the fixed number of times in the fixed time interval.

36. The apparatus of claim 32, wherein the memory further retains instructions related to removing the neighbor relation from the neighbor relations table when the neighbor cell is reported less than the fixed number of times in the fixed time interval and a signal quality of the neighbor cell exceeds a threshold.

37. An apparatus operable in a wireless communication system, the apparatus comprising:

means for counting or storing a number of times a neighbor cell is reported by an access terminal in a fixed time interval;

means for detecting an event where the neighbor cell is reported at least a fixed number of times within the fixed time interval;

means for establishing a neighbor relation based at least in part on the neighbor cell being reported at least the fixed number of times within the fixed time interval; and means for establishing a neighbor relation in a set of neighbor relations based at least in part on the neighbor cell being reported at least the fixed number of times within the fixed time interval.

38. The apparatus of claim 37, wherein the means for detecting identifies the event where the neighbor cell is reported at least the fixed number of times within the fixed time interval and a signal quality of the neighbor cell exceeds a threshold.

39. The apparatus of claim 37, wherein the means for detecting identifies the event where the neighbor cell is reported less than the fixed number of times within the fixed time interval.

40. The apparatus of claim 37, wherein the means for detecting identifies the event where the neighbor cell is reported less than the fixed number of times within the fixed time interval and a signal quality of the neighbor cell exceeds a threshold.

41. The apparatus of claim 37, wherein the means for establishing removes the neighbor relation based at least in part on the neighbor cell being reported less than the fixed number of times within the fixed time interval.

42. The apparatus of claim 37, wherein the means for establishing removes the neighbor relation in the set of neighbor relations based at least in part on the neighbor cell being reported less than the fixed number of times within the fixed time interval.

43. The apparatus of claim 37, wherein the means for establishing removes the neighbor relation based at least in part on the neighbor cell being reported less than the fixed number of times within the fixed interval of time and a signal quality exceeds a threshold.

44. The apparatus of claim 37, wherein the means for establishing removes the neighbor relation in the set of neighbor relations based at least in part on the neighbor cell being reported less than the fixed number of times within the fixed interval of time and a signal quality exceeds a threshold.

* * * * *